US006714835B1

(12) United States Patent
Hart, Jr. et al.

(10) Patent No.: US 6,714,835 B1
(45) Date of Patent: Mar. 30, 2004

(54) SYSTEM AND APPARATUS FOR PREPARATION OF MAILPIECES AND METHOD FOR FILE BASED SETUP OF SUCH APPARATUS

(75) Inventors: William G. Hart, Jr., Sandy Hook, CT (US); Eugene Pritchard, Brookfield, CT (US); Michael Shea, Litchfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/411,099

(22) Filed: Oct. 4, 1999

(51) Int. Cl.[7] .................................................. G06F 7/00

(52) U.S. Cl. ....................... 700/220; 700/221; 700/224; 700/225; 700/226; 700/227; 270/1.03; 270/52.14; 270/58.06; 271/3.01; 271/3.03; 271/3.14; 271/3.15

(58) Field of Search ................................ 700/223, 220, 700/221, 222, 224, 225, 226, 227, 219; 270/1.02, 1.03, 56, 52.14, 52.29, 58.06, 58.26; 271/221, 270, 3.05, 3.01, 3.03, 3.14, 3.15

(56) References Cited

U.S. PATENT DOCUMENTS 3,484,100 A 12/1969 Sather et al. ................. 270/58
4,194,685 A 3/1980 Hill et al. ................... 235/375
4,381,447 A 4/1983 Horvath et al. ............. 250/223
4,734,865 A * 3/1988 Scullion et al. ............. 364/478
4,790,119 A 12/1988 McDaniels ................... 53/411
4,797,830 A 1/1989 Baggarly et al. ...... 364/464.03
4,800,505 A 1/1989 Axelrod et al. .............. 364/478
4,987,547 A 1/1991 Rabindran et al. .......... 364/478
5,177,687 A 1/1993 Baggarly et al.
5,220,770 A 6/1993 Szewczyk et al. ............ 53/493
5,317,654 A 5/1994 Perry et al. ................... 382/61
5,467,434 A 11/1995 Hower, Jr. et al. ......... 395/114
5,493,106 A 2/1996 Hunter ....................... 235/375
5,612,888 A 3/1997 Chang et al.
5,618,037 A 4/1997 Chang et al. .......... 271/258.02
5,650,934 A 7/1997 Manduley
5,659,481 A 8/1997 Qutub et al. ........... 364/478.08
5,684,706 A 11/1997 Harman et al.
5,710,874 A 1/1998 Bergen ....................... 395/115
5,730,299 A 3/1998 Helsley ...................... 209/584
5,761,535 A * 6/1998 Neifert et al. .............. 209/539
5,768,132 A 6/1998 Cordery et al. ........ 364/464.14
5,798,930 A 8/1998 van Oosten ............ 364/478.01
5,816,715 A 10/1998 Harman et al. ............... 400/71
5,818,724 A 10/1998 Brewster, Jr. et al. .. 364/478.08
5,826,869 A 10/1998 Nyffenegger et al. .... 270/52.02
6,119,051 A * 9/2000 Anderson et al. ........... 700/221
6,131,053 A * 10/2000 Nyffenegger et al. .... 270/52.02
6,173,274 B1 * 1/2001 Ryan, Jr. .................... 705/408
6,244,584 B1 * 6/2001 Holbrook et al. ........ 270/52.09

FOREIGN PATENT DOCUMENTS

WO WO 00/25200 5/2000

* cited by examiner

*Primary Examiner*—Donald P. Walsh
*Assistant Examiner*—Jeffrey Shapiro
(74) *Attorney, Agent, or Firm*—Michael J. Cummings; Charles R. Malandra, Jr.; Angelo N. Charles

(57) ABSTRACT

A system, method and apparatus for preparing mailpieces. A inserter system for assembling mailpieces in a mailing job is controlled in accordance with mailpiece records in a corresponding mailing control file. The inserter system scans control documents included in the mailpieces to identify corresponding mailpiece records. Initially the inserter system accesses the mailing control file to identify set-up parameter values for the current mailing job.

18 Claims, 4 Drawing Sheets

SYSTEM AND APPARATUS FOR PREPARATION OF MAILPIECES AND METHOD FOR FILE BASED SETUP OF SUCH APPARATUS

RELATED APPLICATIONS

The present application shares common elements of disclosure with commonly assigned, U.S. application Ser. No. 09/124,501; titled: System, Method and Apparatus for Preparation of Mailpieces; filed: Jul. 29, 1988.

BACKGROUND OF THE INVENTION

This invention relates to the preparation of large mailings and the like. More particularly it relates to systems and apparatus for the preparation of documents and the assembly of multiple mailpieces including such documents.

The term "mailpieces" as used herein means items intended to be delivered by a postal service or private courier service. Typically preparation of mailpieces includes, but is not limited to, printing or otherwise providing documents including variable information pertaining to addressees of the mailpieces and the assembly of such documents with other elements of the mailpiece. The term "assembly" as used herein means the execution of actions to incorporate the documents into mailpieces. Typically, such actions can include: accumulating documents with other materials such as preprinted inserts, folding and inserting the resulting accumulations into envelopes, printing addresses and other information on the outside of the envelopes, and franking the mailpiece with an appropriate postage amount.

Inserter systems for the assembly of mailpieces are well known. A typical inserter system is shown in FIG. 1. Inserter system 10 includes burster/feeder 12 which inputs preprinted documents in fanfold form, separates the documents and removes and discards sprocket feed strips FS from the edges of the document. Each group of documents for a particular mailpiece includes at least control document CD. On control documents CD strips FS are marked with code BC which is read by scanner 14 before strips FS are removed. In simpler systems code BC can be a "dash code" of the type known for use in directly controlling inserter systems. In newer, more complex systems code BC can be a conventional bar code which serves as a pointer to a mailpiece record which record contains information for controlling the inserter; as will be more fully described below. In other known inserter systems, the documents can be in cut sheet form and a cut sheet feeder can be used in place of burster/feeder 12.

Control document CD, and any additional associated pages are fed from burster feeder 12 to accumulator 16 where documents for each mailpiece are formed into separate accumulations A and folded.

Accumulation A is then fed to insert stations 20A and 20B where preprinted inserts I are added to form accumulations A1 and A2. Those skilled in the art will of course recognize that the number of such insert stations used will vary from application to application.

Accumulation A2 is then fed to insert station 22 where it is inserted into an envelope and sealed to form mailpiece MP.

Mailpiece MP is then fed to address printer 24 which prints address AD on the outside of the envelope. Depending on the size of the print field of printer 24, printer 24 also can be used to print other information such as a variable return address (or other text message) RA, logo L, and postal barcode PBC on the envelope. ( Those skilled in the art will recognize that dash codes as described above typically cannot include sufficient information to define even address AD so that systems incorporating dash codes typically use window envelopes to provide addressing information.)

System 10 also includes out stacker 30 for diverting mailpieces when an error is detected.

As noted above, inserter systems wherein said code BC is a barcode which is used as a pointer to a mailpiece record (i.e. an electronic record associated with a mailpiece to be assembled) are known. By incorporating data for controlling assembly of mailpieces in mailpiece records an essentially unlimited amount of data can be associated with each mailpiece. Thus addresses, return addresses, logos, and postal bar codes can all be readily specified in addition to specification of the number of inserts to be added at each insert feeder, postage amounts, etc. Systems incorporating such mailpiece records are described in commonly assigned U.S. Pat. No. 4,800,505; to: Axelrod et al.; for: Mail Preparation System; issued Jan. 24, 1989, which is hereby incorporated by reference. Embodiments of the system of U.S. Pat. No. 4,800,505 are marketed by the assignee of the present application under the name "Direct Connection", described in *The Direct Connection*, version 1.30.

While systems such as those described above have proven highly successful certain disadvantages remain. In particular certain initial job set-up parameters must be defined for systems such as that shown in FIG. 1 for each mailing job. Such parameters can include feeder settings, document weights, document priorities, and postage meter settings. Typically these parameters where set by defining one or more "modes", i.e. records of particular sets of values of the job set-up parameters for jobs typically run in a mailroom and loading the corresponding mode when a job was to be run. When an atypical job not corresponding to an existing mode was to be run an operator would load a mode and override selected default values in that mode with the actual values for that job. This of course creates a possibility that an operator will override the wrong parameter or assign incorrect parameter values. As a result many mailrooms establish unique modes for every combination of parameter values which will be used. The operator is then responsible for selecting the correct corresponding mode for each job. This approach results in many modes on an inserter system; contributing to two potential problems: the operator may select the wrong mode, or, when a parameter value must be changed (e.g. a different weight print stock is introduced) the change is not made to all modes which require it.

Thus it is an object of the subject invention to provide a system, apparatus and method for the preparation and assembly of mailpieces with an improved capability for handling system set-up.

BRIEF SUMMARY OF THE INVENTION

The above object is achieved and the disadvantages of the prior art are overcome in accordance with the subject invention by means of a system, apparatus and method for preparing mailpieces and the like; the mailpieces each including a control document, the control documents each including data for determining a unique identification code. The apparatus includes: a data store storing a mailing control file, the mailing control file comprising a plurality of mailpiece records, each of the records including a plurality of fields, the fields containing data for controlling assembly of a mailpiece, and each of the records including one of the unique identification codes, whereby each of the records defines preparation of at least one corresponding mailpiece, the file also comprising data for determining specified job parameters for initial set-up of the apparatus; an inserter system or the like for assembling the mailpieces, the inserter system including a scanner for detecting and outputting the determining data from the control documents, the inserter system being responsive to initial set-up signals to set-up job parameters for a particular mailing job corresponding to the mailing control file; and a controller. The controller functions to: initially access the data store to determine the specified job parameters; generate the initial set-up signals to control set-up of the inserter system in accordance with the specified job parameters; and then access the records in accordance with the determining data from the control documents; and control the inserter system to prepare the corresponding mailpieces in accordance with the records.

In accordance with one aspect of the subject invention, the specified job parameters are comprised in a header for the mailing control file.

In accordance with another aspect of the subject invention, the specified job parameters are comprised in a file separate from the mailing control file.

In accordance with another aspect of the subject invention, the separate file is comprised in a database of set-up mode files.

In accordance with still another aspect of the subject invention the controller derives the separate file's name as a fiction of the mailing control file's name.

Other objects and advantages of the subject invention will be apparent to those skilled in the art from consideration of the attached drawings and the detailed description set forth below.

DETAILED DESCRIPTION OF PREFERRED EMBODIMENTS OF THE SUBJECT INVENTION

Figure 2:
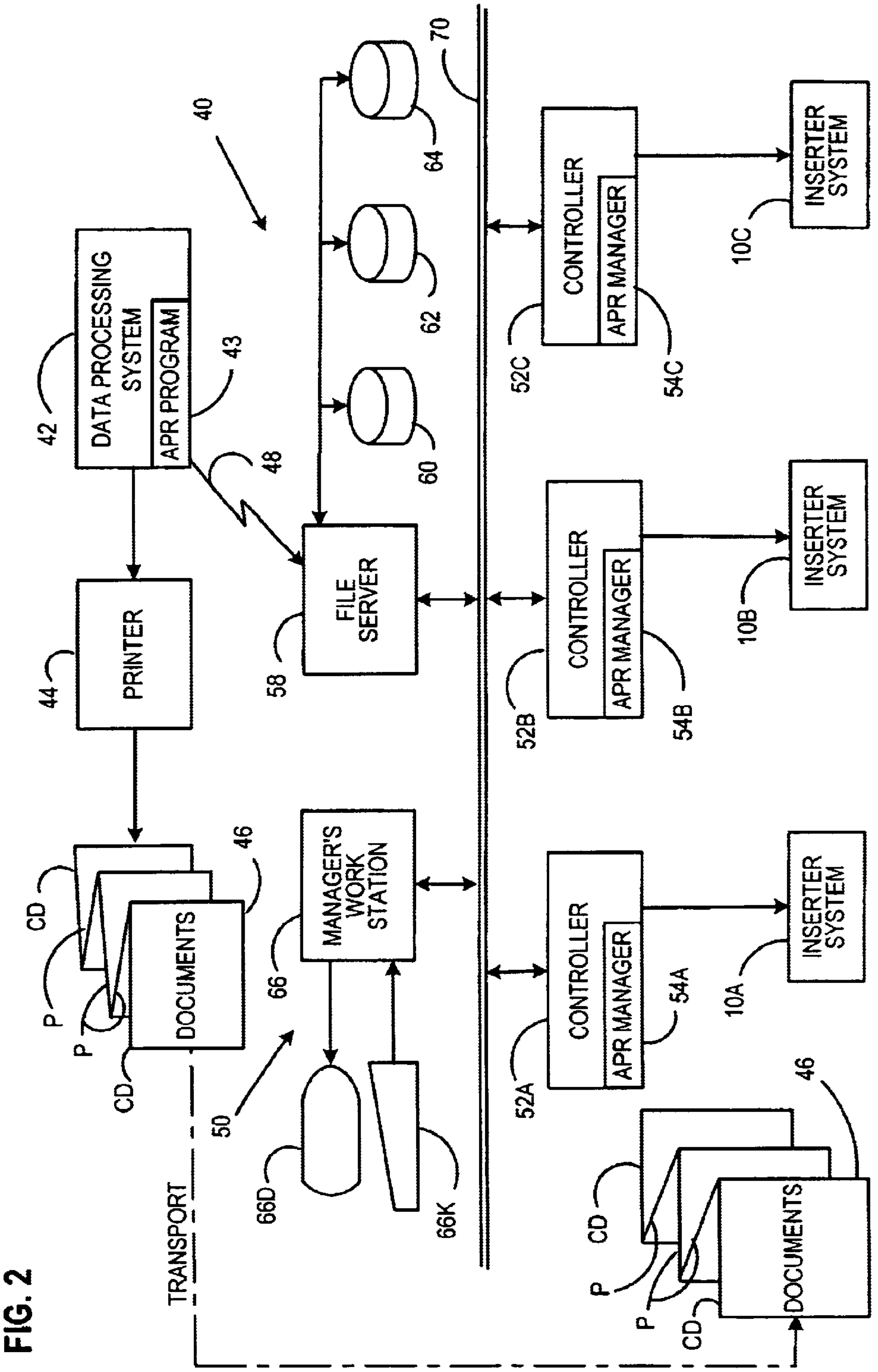
FIG. 2 shows a schematic block diagram of a system for preparing mailpieces.

FIG. 2 shows mail preparation system 40 which includes data processing system 42 and mailpiece assembly system 50.

Data processing system 42 is programmed in a conventional manner to generate documents 46, which include control documents CD and associated documents P; with one control document CD and its associated documents P being associated with each mailpiece, wherein control documents CD are marked with barcode pointers to mailpiece records in the manner described above. In the embodiment shown, system 42 controls printer 44 to print documents 46 directly and documents 46 are transported physically for assembly; however, any convenient method of output ant transport, such as electronic output and transmission for remote printing, can be used and is within the contemplation of the subject invention.

Figure 3A:
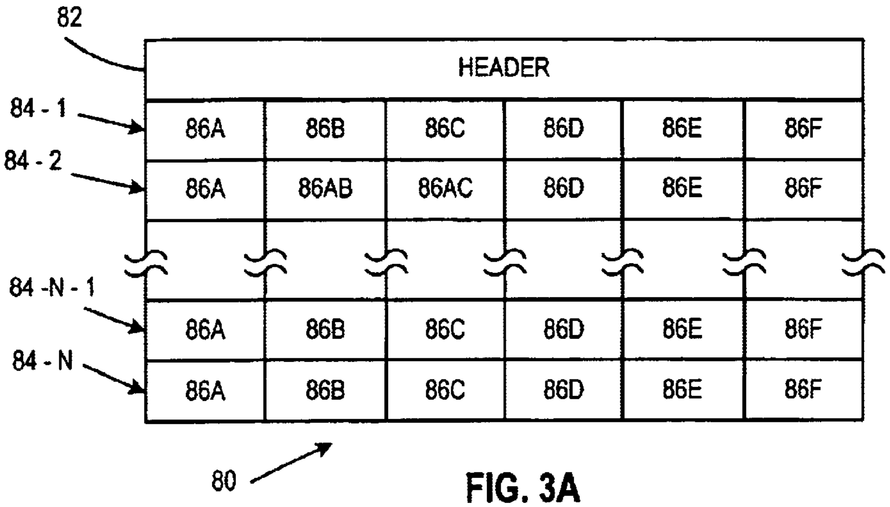
FIGS. 3A, 3B and 3C show a mailing control file and a typical mailpiece record and header.

Data processing system 42 also generates and outputs mailing control file 80, shown in FIG. 3A, which includes header 82 and a plurality of mailpiece records 84-1 through 84-N, in a conventional manner. Mailpiece records 84-1 through 84-N each include a plurality of fields 86A–86F containing data for controlling assembly of the mailpiece.

Figure 3B:
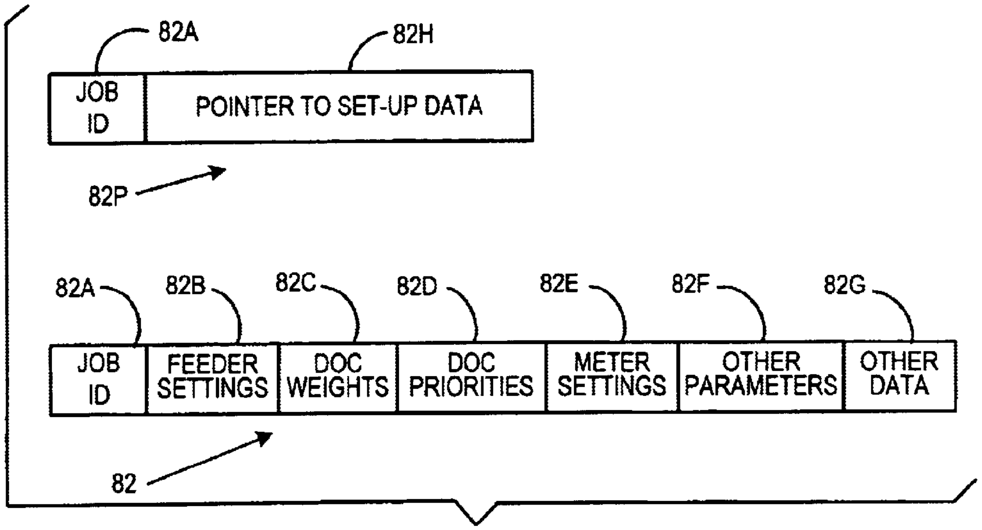

In a preferred embodiment, the mailing control file also includes data in header 82, shown in FIG. 3B, for defining set-up parameters for the mailing job corresponding to file 80. In FIG. 3B header 82 includes a job ID in field 82A, feeder settings in field 82B, document weights in field 82C, document priorities in field 82D, postage meter settings in field 82E and other set-up parameters, as discussed above, in field (or fields) 82F. In other embodiments of the subject invention field (or fields) 82G can contain additional information relating to the mailing as a whole, such as an account number to be charged mailing costs.

In another preferred embodiment information such as is shown in header 82 can be stored as a separate file, which can be part of a database of job set-up modes. This separate file can then be accessed in any convenient manner. For example, the separate file name can be derived as a function of the job name; e.g. if the job name is mailxxxx.job then the separate record name would be mailxxxx.set. Or, header 82P, also shown in FIG. 3B, which includes pointer 82H to the separate file, can be used in place of header 82.

Figure 3C:
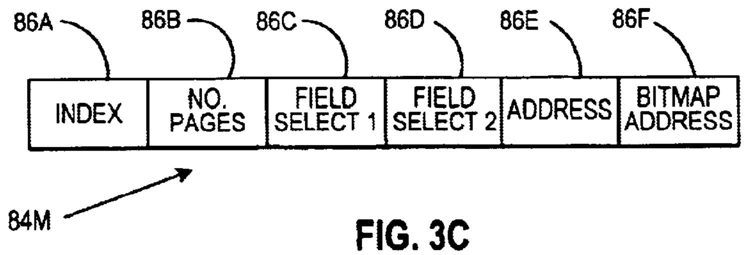

FIG. 3C shows typical mailing record 84-M. (In general, the content and format of mailpiece records can be freely specified by system users. However, the record must include an index, or identification code, which establishes correspondence between the record and a corresponding mailpiece.) In record 84-M field 86A contains an index, or identification code; field 86B specifies the number of pages in the mailpiece; fields 86C and D specify whether or not corresponding insert stations will add inserts to the mailpiece; field 86E is a printer control field which specifies an address for the corresponding mailpiece; and field 86F is a printer control field.

The mailing control file is communicated to mailpiece assembly system 50 through communications link 48, which can utilize any convenient form of communication, such as electronic data communication or the physical transfer of media without departing from the scope the subject invention.

Figure 1:
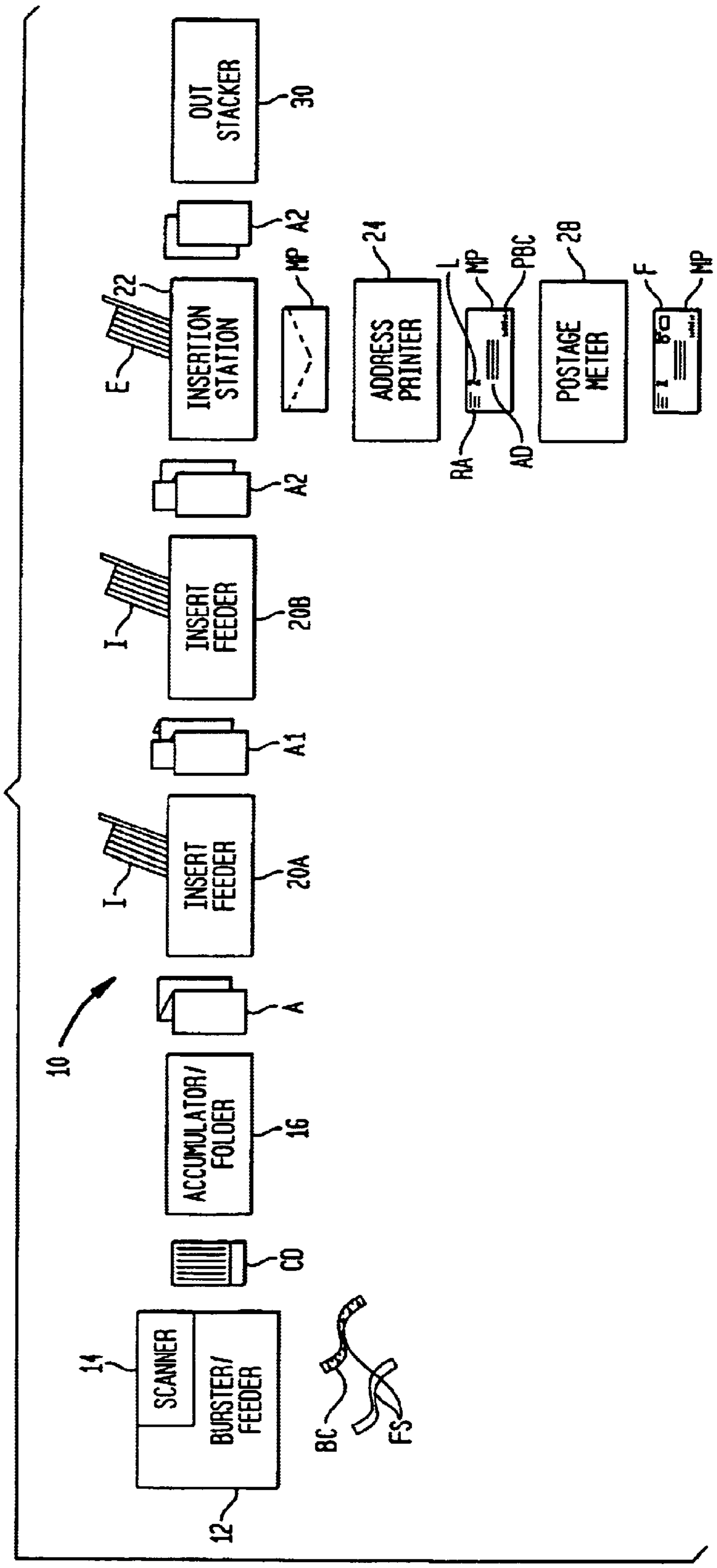
FIG. 1 (PRIOR ART)
FIG. 1 shows a schematic block diagram of a prior art inserter system.

In the embodiment shown in FIG. 2, mailpiece assembly system 50 includes inserter systems 10A, 10B, and 10C, which are substantially similar to conventional inserter system 10 described above with reference to FIG. 1, but necessarily must be of the type wherein control documents CD include a barcode pointer to a mailpiece record to carryout the functions of mailpiece assembly. In other embodiments different types of inserter systems having expanded (e.g. more insert modules ) or different functions (e.g. matched mail generation or address verification), but still including barcode pointers, can be used without departing from the scope of the subject invention.

Mailpiece assembly system 50 also includes controllers 52A, 52B, and 52C for controlling operation of inserter systems 10A, 10B, and 10C in a manner which will be described more fully below.

Mailpiece assembly system also includes file server 58 which manages mailing control file database 60 which stores mailing control files downloaded from data processing system 42, and which also communicate appropriate mailing control files to controllers 52A, B or C as mailings are assigned to inserter systems, as will be more fully described below.

Mailpiece assembly system also includes manager's workstation 66, which includes display 66D and keyboard 66K through which a site manager can provide operational management input such as accessing and editing database 60 or assigning mailings to various inserter systems.

Communications among workstation 66, file server 58 and controllers 52A, B and C is preferably carried out over a conventional local area network in a manner well understood by those skilled in the art and which need not be discussed further for an understanding of the subject invention.

Figure 4:
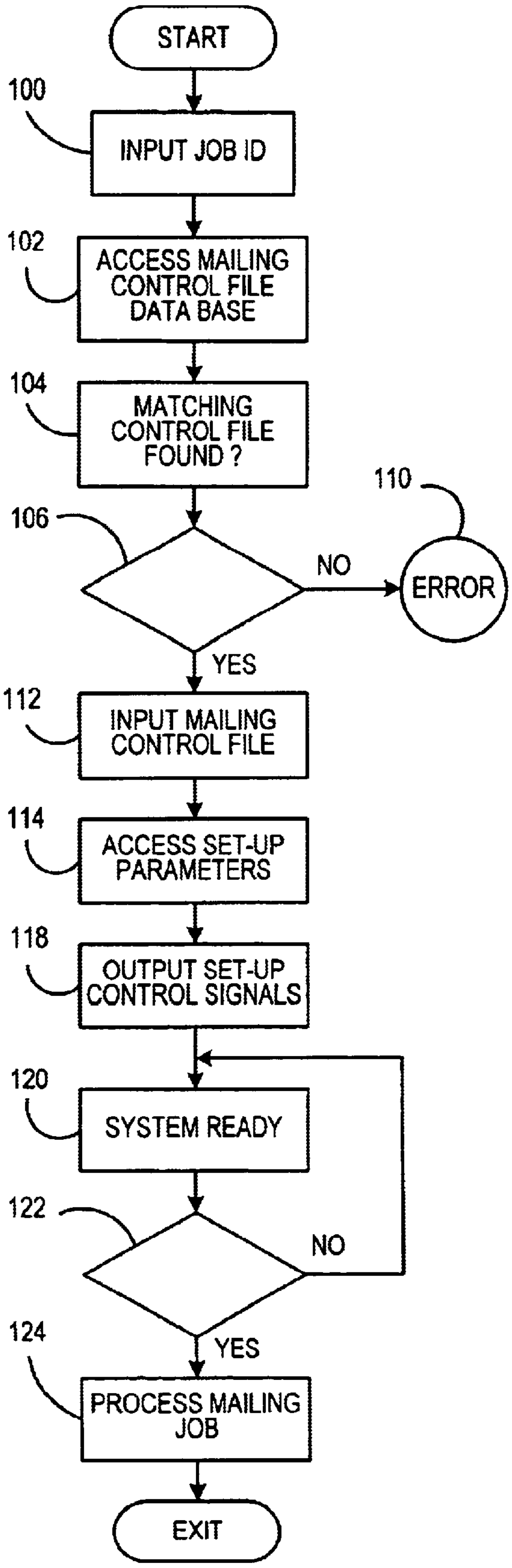
FIG. 4 shows a flow diagram of the set-up of the system of FIG. 2.

Turning to FIGS. 4A, B, and C, a high level flow diagram of the set-up of mailpiece assembly system 50 in accordance with the method of the subject invention is shown.

At 100 a selected controller, hereinafter assumed for purposes of explanation to be controller 52A, inputs an ID for a mailing job assigned through manager's workstation 66. In other embodiments the mailing job ID can be read from the first mailpiece, or input in any convenient manner. At 102 controller 52A accesses the corresponding mailing control file in database 60 through file server 58. ( In other equivalent embodiments workstation 66 directs server 58 to download the selected mailing control file to controller 52A.) Then at 104 controller 52A tests to determine if an appropriate matching control file has been found, and if not at 106 exits to error routine 110. If the appropriate mailing control file is found controller 52A continues to 112 to input the appropriate mailing control file.

Then at 114 controller 52A accesses the set-up parameter values for the current mailing job, and at 118 outputs control signals to set-up inserter system 10A in accordance with those parameter values. The set-up parameter values are accessed either from header 82 or, in other preferred embodiments, from a separate file, as described above.

Other parameter values, such as document priorities and document weights, are used directly by controller 52A to process the mailing job in a manner which is well known to those skilled in the art. Typically, for example, controller 52A can use document weights and priorities to select a subset of inserts specified for mailpiece to remain within a current weight break and avoid an increase required postage.

At 120 controller 52A tests to determine if inserter system 10A is ready and has responded to the control signals; that is documents, inserts, envelopes, etc. have been loaded, needed stations of inserter system 10A have been activated, and all necessary preparatory actions have been taken, as will be well understood by those skilled in the art. If system 10A is not ready then at 122 controller 52A loops back through 120 to wait for a ready condition. Otherwise at 124 controller 52A controls inserter system 10A to process the mailing job in accordance with records 84-1 through 84-N in a manner which is well known to those skilled in the art and which need not be described further here for an understanding of the subject invention.

The embodiments described above and illustrated in the attached drawings have been given by way of example and illustration only from the teaching of the present application those skilled in the art will readily recognize numerous other embodiments in accordance with the subject invention. Accordingly, limitations on the subject invention are to be found only in the claims set forth below.

What is claimed is:

1. Apparatus for assembling mailpieces, said mailpieces each including a control document, said control documents each including data for determining a unique identification code, said apparatus comprising:

a) storing means for storing a mailing control file, said mailing control file comprising a plurality of mailpiece records, each of said records including a plurality of fields, said fields containing data for controlling assembly of a mailpiece, and each of said records including one of said unique identification codes, whereby each of said records defines preparation of at least one corresponding mailpiece, said file also comprising data for determining specified job parameters for initial set-up of said apparatus;

b) means for assembling said mailpieces, said assembling means including means for detecting and outputting said determining data from said control documents;

c) said assembling means being responsive to initial set-up signals to set-up job parameters for a particular mailing job corresponding to said mailing control file; and d) a controller for:

d1) initially accessing said storing means to determine said specified job parameters;

d2) generating said initial set-up signals to control set-up of said assembling means in accordance with said specified job parameters; then d3) accessing said records in accordance with said determining data from said control documents; and d4) controlling said assembling means to prepare said corresponding mailpieces in accordance with said records.

2. Apparatus as described in claim 1 wherein said specified job parameters are comprised in a header for said mailing control file.

3. Apparatus as described in claim 1 wherein said specified job parameters are comprised in a file separate from said mailing control file.

4. Apparatus as described in claim 3 wherein said separate file is comprised in a database of set-up mode files.

5. Apparatus as described in claim 3 wherein said controller derives said separate file's name as a function of said mailing control file's name.

6. Apparatus as described in claim 1 wherein at least one of said specified job parameters is used directly by said control means.

7. A system for preparing mailpieces, said mailpieces each including a control document, said system comprising:

a) a data processing system programmed to generate a mailing job comprising a plurality of mailpieces, by;

a1) outputting a mailing control file, said mailing control file comprising a plurality of mailpiece records, each of said records including a plurality of fields, said fields containing data for controlling assembly of a mailpiece, and each of said records including a unique identification code, whereby each of said records defines preparation of at least one corresponding mailpiece, said file also comprising data for determining specified job parameters for initial set-up of said apparatus;

a2) producing at least a control document for each of said mailpieces, each of said control documents including data for determining a corresponding one of said identification codes;

b) storing means for receiving and storing said mailing control file, c) means for assembling said mailpieces, said assembling means including means for detecting and outputting said determining data from said control documents;

d) said assembling means being responsive to initial set-up signals to set-up job parameters for a particular mailing job corresponding to said mailing control file; and e) a controller for:

e1) initially accessing said storing means to determine said specified job parameters;

e2) generating said initial set-up signals to control set-up of said assembling means in accordance with said specified job parameters; then e3) accessing said records in accordance with said determining data from said control documents; and e4) controlling said assembling means to prepare said corresponding mailpieces in accordance with said records.

8. A system as described in claim 7 wherein said specified job parameters are comprised in a header for said mailing control file.

9. A system as described in claim 7 wherein said specified job parameters are comprised in a file separate from said mailing control file.

10. A system as described in claim 9 wherein said separate file is comprised in a database of set-up mode files.

11. A system as described in claim 9 wherein said controller derives said separate file's name as a function of said mailing control file's name.

12. A system as described in claim 7 wherein at least one of said specified job parameters is used directly by said controller.

13. A method for controlling apparatus for assembly of mailpieces, said apparatus including means for assembling said mail pieces, said mailpieces each including a control document, said control documents each including data for determining a unique identification code, said method comprising the steps of:

a) storing a mailing control file, said mailing control file comprising a plurality of mailpiece records, each of said records including a plurality of fields, said fields containing data for controlling assembly of a mailpiece, and each of said records including one of said unique identification codes, whereby each of said records defines preparation of at least one corresponding mailpiece, said file also comprising data for determining specified job parameters for initial set-up of said means for assembling said mail pieces b) initially accessing said storing means to determine said specified job parameters;

c) generating initial set-up signals to control set-up of said assembling means in accordance with said specified job parameters; then d) accessing said records in accordance with said determining data from said control documents; and e) controlling said assembling means to prepare said corresponding mailpieces in accordance with said records.

14. A method as described in claim 13 wherein said specified job parameters are comprised in a header for said mailing control file.

15. A method as described in claim 13 wherein said specified job parameters are comprised in a file separate from said mailing control file.

16. A method as described in claim 15 wherein said separate file is comprised in a database of set-up mode files.

17. A method as described in claim 15 wherein said controller derives said separate file's name as a function of said mailing control file's name.

18. A method as described in claim 13 wherein at least one of said specified job parameters is used directly by said step C.

* * * * *